(12) United States Patent
Igarashi et al.

(10) Patent No.: US 10,830,730 B2
(45) Date of Patent: Nov. 10, 2020

(54) SENSOR ELEMENT AND GAS SENSOR INCLUDING THE SENSOR

(71) Applicant: NGK SPARK PLUG CO., LTD., Nagoya (JP)

(72) Inventors: Ai Igarashi, Konan (JP); Kouji Toida, Kani (JP); Shun Sakuma, Kakamigahara (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 94 days.

(21) Appl. No.: 16/006,222

(22) Filed: Jun. 12, 2018

(65) Prior Publication Data

US 2018/0356363 A1 Dec. 13, 2018

(30) Foreign Application Priority Data

Jun. 13, 2017 (JP) .................. 2017-116056

(51) Int. Cl.
*G01N 27/407* (2006.01)
(52) U.S. Cl.
CPC ..... *G01N 27/4071* (2013.01); *G01N 27/4077* (2013.01)
(58) Field of Classification Search
CPC ............................................. G01N 27/406–41
See application file for complete search history.

(56) References Cited

U.S. PATENT DOCUMENTS

| | | | | |
|---|---|---|---|---|
| 2005/0093551 A1* | 5/2005 | Weyl | .................. | G01N 27/4071 324/464 |
| 2009/0117007 A1* | 5/2009 | Furuta | ................ | G01N 27/4071 422/83 |

FOREIGN PATENT DOCUMENTS

JP 2003-107042 A 4/2003

* cited by examiner

*Primary Examiner* — J. Christopher Ball
(74) *Attorney, Agent, or Firm* — Sughrue Mion, PLLC

(57) ABSTRACT

A plate-shaped sensor element (10) including at least a first layer (150), a second layer (130), and a third layer (140) being stacked in a stacking direction. The first layer and the third layer are mainly formed of ceramic. The second layer is disposed between the first layer and the third layer in the stacking direction. The second layer has an air introduction hole (131) opened at an end surface. In a cross-section perpendicular to a direction of an axis O, a length L1 of a shortest line segment P1 connecting an upper end surface (10a, 10b) of the sensor element and the centroid G1 of the sensor element and a length L2 of a shortest line segment P2 connecting the upper end surface of the sensor element and the centroid G2 of the air introduction hole, satisfy a relationship of $|L2-L1|/L1 \leq 0.05$.

7 Claims, 4 Drawing Sheets

SENSOR ELEMENT AND GAS SENSOR INCLUDING THE SENSOR

BACKGROUND OF THE INVENTION

1. Field of the Invention

The present invention relates to: a sensor element suitably used for detecting the concentration of a specific gas contained in a combustion gas or an exhaust gas in or from a combustor, an internal combustion engine, or the like; and a gas sensor including the sensor element.

2. Description of the Related Art

To date, a gas sensor has been used for detecting the concentration of a specific component (e.g., oxygen) in an exhaust gas from an internal combustion engine. As an example, a gas sensor has been known which has a sensor element therein, and in which the sensor element has a plate shape obtained by stacking a plurality of ceramic layers. The sensor element includes a solid electrolyte and a pair of electrodes disposed on the solid electrolyte, and one of the electrodes faces an air introduction hole that is opened inside the element (refer to Patent Document 1).

As shown in FIG. 5, the air introduction hole 510 is opened at one end surface of the sensor element. The air introduction hole 510 can be formed by disposing, between a first layer 501 and a third layer 503 each having the dimension of the sensor element, a second layer 502 having a space that is formed by cutting out a portion thereof in a U shape toward the end surface as viewed in the stacking direction, for example.

[Patent Document 1] Japanese Patent Application Laid-Open (kokai) No. 2003-107042 (FIG. 1, FIG. 2)

3. Problems to be Solved by the Invention

However, in the case where the air introduction hole 510 is opened inside the plate-shaped sensor element obtained by stacking the ceramic layers, since the respective strengths of the first layer 501 and the third layer 503 located above and below the air introduction hole 510 are low, if a load F is applied in the stacking direction, cracking may occur in either the first layer 501 or the third layer 503 having the lower strength (in FIG. 5, the first layer 501 having the smaller thickness).

SUMMARY OF THE INVENTION

It is therefore an object of the present invention to provide a sensor element including an air introduction hole and having improved strength; and a gas sensor including the sensor element.

The above object has been achieved by providing (1) a plate-shaped sensor element extending in an axial direction, and comprising at least a first layer, a second layer, and a third layer being stacked in a stacking direction. The first layer and the third layer are mainly formed of ceramic. The second layer is disposed between the first layer and the third layer in the stacking direction. The second layer has an air introduction hole opened at an end surface thereof. In a cross-section perpendicular to the direction of the axis, a length L1 of a shortest line segment P1 connecting an upper end surface of the sensor element and the centroid G1 of the sensor element and a length L2 of a shortest line segment P2 connecting the upper end surface of the sensor element and the centroid G2 of the air introduction hole, satisfy a relationship of $|L2-L1|/L1 \leq 0.05$.

According to the sensor element (1), the difference in distance between the centers of gravity G1 and G2 from the upper end surface of the sensor element toward the stacking direction is less than or equal to ±5%. Since the air introduction chamber occupies the greater part (or the entirety) of the air gap in the sensor element, the centers of gravity G1 and G2 being close to each other in the stacking direction indicate that the thicknesses (strengths) of the first layer and the third layer disposed opposite each other in the stacking direction with the air introduction chamber therebetween are approximately equal.

Therefore, when a load is applied in the stacking direction to the first layer and the third layer located above and below the air introduction hole, an approximately uniform stress is generated against the first layer and the third layer, thereby improving the breaking strength of the sensor element as compared to the case where the strength of one of the first layer and the third layer is lower than that of the other layer.

In a preferred embodiment (2) of the sensor element (1) above, a relationship of $L1=L2$ is satisfied.

According to the sensor element (2), since the thicknesses (strengths) of the first layer and the third layer are closer to each other, the breaking strength of the sensor element is further improved.

In another preferred embodiment (3) of the sensor element (1) or (2) above, when a load is applied toward the centroid G2 along the stacking direction from each of outer surfaces of the first layer and the third layer in a region within the air introduction hole as viewed in the stacking direction, a breaking strength B1 of the first layer and breaking strength B2 of the third layer preferably satisfy a relationship of $|B1-B2|/B2 \leq 0.19$.

According to the sensor element (3), the strengths of the first layer and the third layer are approximately equal to each other (the difference between the breaking strengths B1 and B2 being less than or equal to ±19%), thereby improving the breaking strength of the sensor element when the load is applied in the stacking direction.

In yet another preferred embodiment (4), the sensor element of any of (1) to (3) above is a limiting current type sensor element.

Since the limiting current type sensor element tends to have a larger air introduction chamber, the effects of the present invention are pronounced.

In a second aspect (5), the present invention provides a gas sensor comprising the plate-shaped sensor element of any of (1) to (4) above, and a metallic shell holding the sensor element.

Effects of the Invention

According to the present invention, the strength of a sensor element including an air introduction hole can be improved.

DESCRIPTION OF REFERENCE NUMERALS

Figure 1:
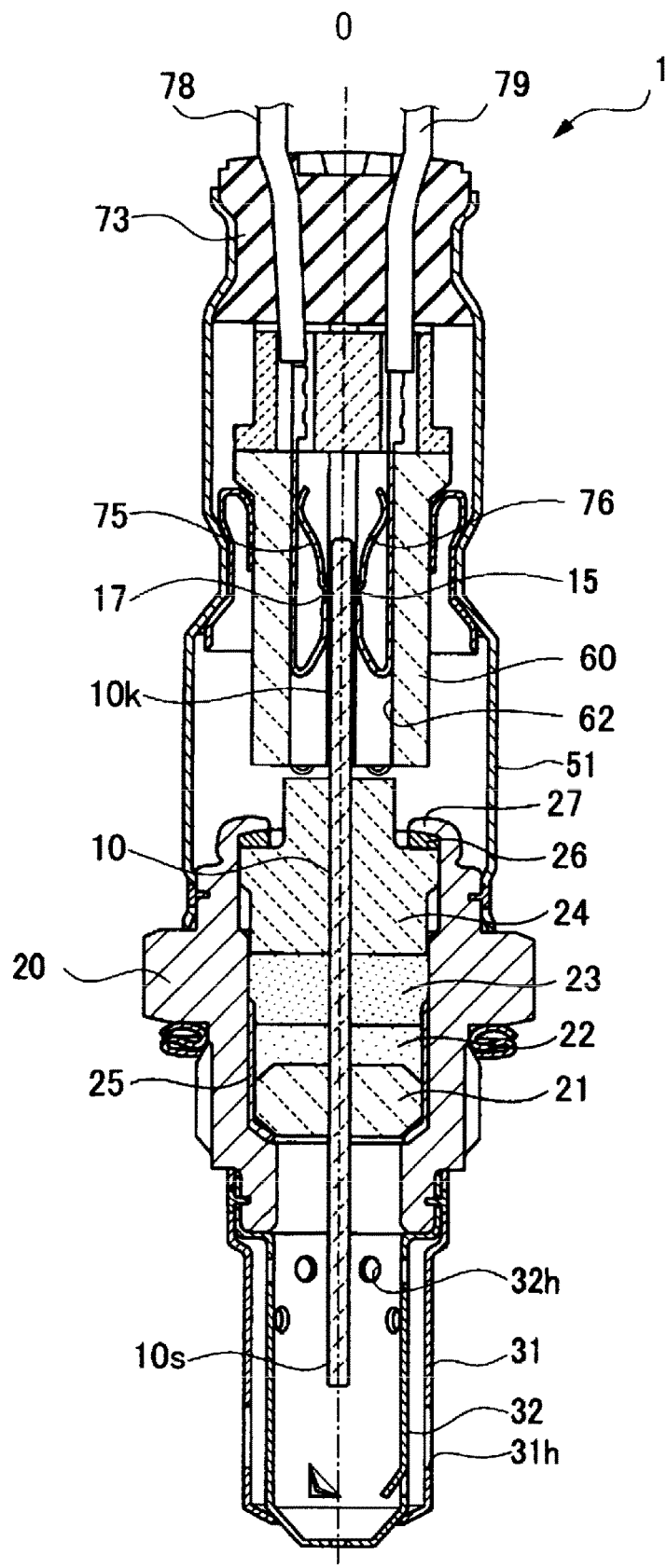
FIG. 1 is a cross-sectional view of an example of a gas sensor (oxygen sensor) including a sensor element, taken along the axial direction of the gas sensor, according to an embodiment of the present invention.

Reference numerals used to identify various features in the drawings include the following.
1 gas sensor element
10 sensor element
10a, 10b upper end surface of sensor element
20 metallic shell
150 first layer
130 second layer
131 air introduction hole
140 third layer
O axis

DETAILED DESCRIPTION OF THE PREFERRED EMBODIMENTS

Hereinafter, an embodiment of the present invention will be described in greater detail with reference to the drawings. However, the present invention should not be construed as being limited thereto.

Figure 2:
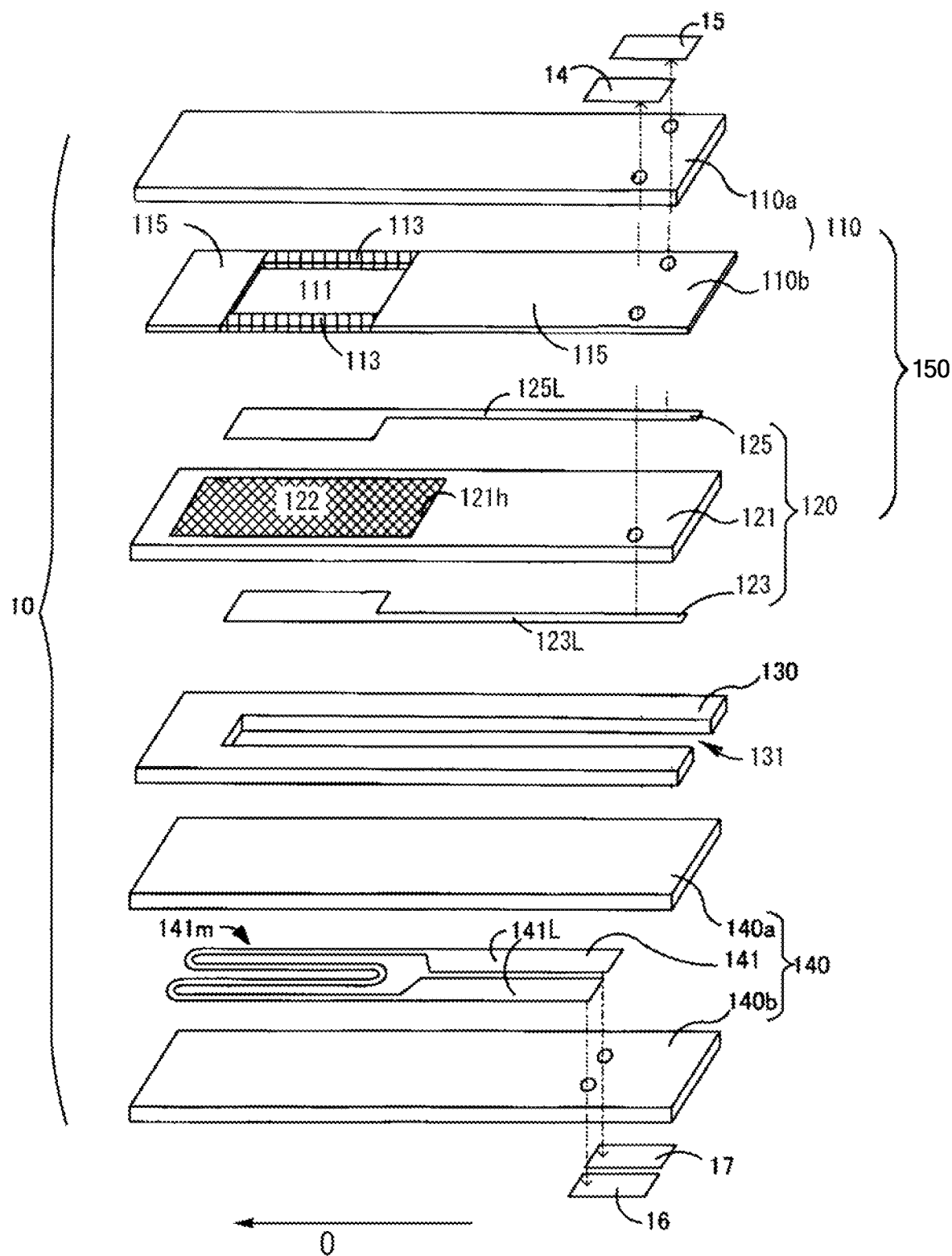
FIG. 2 is a schematic exploded perspective view of the sensor element.
Figure 3:
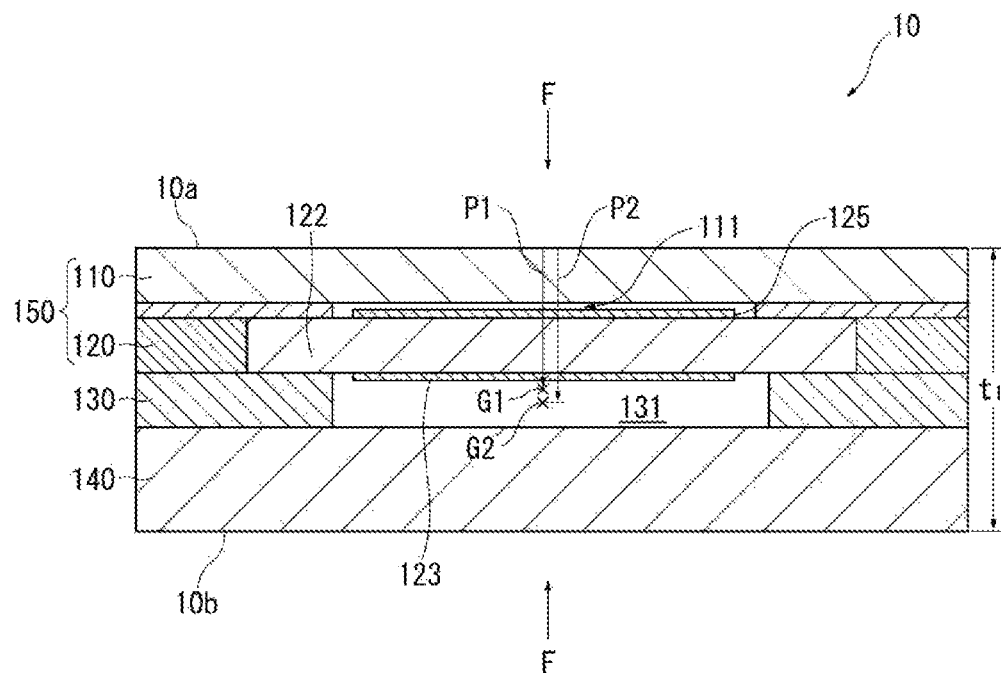
FIG. 3 is a schematic cross-sectional view orthogonal to the axial direction of the sensor element.

FIG. 1 is a cross-sectional view of an example of a gas sensor (oxygen sensor) 1 including a sensor element 10, taken along the direction of an axis O, according to an embodiment of the present invention. FIG. 2 is a schematic exploded perspective view of the sensor element 10. FIG. 3 is a cross-sectional view orthogonal to the direction of the axis O of the sensor element 10.

The gas sensor 1 mainly includes the sensor element 10 and a metallic shell 20. The sensor element 10 is an elongated plate-shaped element, and includes a sensor cell for measuring the concentration of oxygen in an exhaust gas which is a measurement target gas. The sensor element 10 has: a front end portion 10s in which the sensor cell is disposed; and a rear end portion 10k on which sensor-side electrode pads 14, 15 (only 15 is shown) electrically connected to lead wires 78, 79 are disposed. The sensor element 10 is held by the metallic shell 20 such that the front end portion 10s projects from a front end of the metallic shell 20 and the rear end portion 10k projects from a rear end of the metallic shell 20.

The metallic shell 20 has a tubular shape and holds the sensor element 10 therein. Tubular-shaped metallic external protector 31 and internal protector 32 are disposed at the front side of the metallic shell 20 so as to cover the front end portion 10s of the sensor element 10. The external protector 31 and the internal protector 32 have a plurality of gas introduction holes 31h, 32h through which the measurement target gas is introduced to a space around the front end portion 10s of the sensor element 10.

Inside the metallic shell 20, an annular ceramic holder 21 surrounding the outer periphery of the sensor element 10, powder-charged layers (hereinafter also referred to as talc rings) 22, 23, and a ceramic sleeve 24 are disposed in order from the front side. A metal holder 25 is disposed on the outer periphery of the ceramic holder 21 and the talc ring 22. A crimping packing 26 is disposed on the rear side of the ceramic sleeve 24. The rear end portion 27 of the metallic shell 20 is crimped so as to press the ceramic sleeve 24 frontward via the crimping packing 26.

On the rear side of the metallic shell 20, a tubular outer sheath 51 is disposed so as to surround the rear end portion 10k of the sensor element 10. Further, inside the outer sheath 51, a separator 60 is disposed. The separator 60 surrounds the rear end portion 10k of the sensor element 10, and separates four lead wires 78, 79 (only two of them are shown in FIG. 1) from each other and holds the lead wires.

The separator 60 has an insertion hole 62 penetrating therethrough in the direction of the axis O. The rear end portion 10k of the sensor element 10 is inserted in the insertion hole 62. In the insertion hole 62, four terminal members 75, 76 are disposed to be separated from each other, and are electrically connected to the sensor-side electrode pads 14, 15 of the sensor element 10 and to two heater-side electrode pads 16, 17 (only 17 is shown).

Meanwhile, on the rear side of the outer sheath 51, a grommet 73 that closes a rear-end opening of the outer sheath 51 is fitted. The four lead wires 78, 79 pass through insertion holes of the grommet 73 to be drawn outward. The rear end portion 10k of the sensor element 10 and the external air communicate with each other via a communication path (not shown).

Next, the structure of the sensor element 10 will be described with reference to FIG. 2 and FIG. 3.

The sensor element 10 is obtained by stacking, in order from the top in FIG. 2, a first ceramic layer 110, a second ceramic layer 120, a third ceramic layer 130, and a heater layer 140 in the thickness direction (stacking direction). The respective layers 110 to 140 are made of insulating ceramic such as alumina, and have rectangular plate shapes having equal outer dimensions (at least widths and lengths).

The first ceramic layer 110 is obtained by stacking a protection layer 110a and a measurement chamber layer 110b. A rectangular measurement chamber 111 is opened at the front side (left side in FIG. 2) of the measurement chamber layer 110b. Porous diffusion layers 113 that demarcate the measurement chamber 111 from the outside are disposed at opposed side surfaces, along the long side, of the measurement chamber layer 110b. Meanwhile, ceramic insulating layers 115 forming side walls of the measurement chamber 111 are disposed on the front side and the rear side of the measurement chamber 111.

The measurement chamber 111 communicates with the outside via the porous diffusion layers 113, and the porous diffusion layers 113 realize gas diffusion between the outside and the measurement chamber 111 under predetermined rate-controlling conditions. Thus, the sensor element 10 is formed as a limiting current type sensor element. In addition, the porous diffusion layers 113 form opposed side walls along the longitudinal direction of the sensor element 10 (direction of the axis O), and face the outside.

The second ceramic layer 120 includes: a cell layer 121 having a rectangular-plate-shaped solid electrolyte 122; a reference gas side electrode 123 provided on a lower surface of the solid electrolyte 122; and a measurement target gas side electrode 125 provided on a upper surface of the solid electrolyte 122. A penetration portion 121h that is opened in a rectangular shape is provided on the front side (left side in FIG. 2) of the cell layer 121, and the solid electrolyte 122 is disposed so as to be embedded in the penetration portion 121h. Lead portions 123L, 125L extend from the reference gas side electrode 123 and the measurement target gas side electrode 125 toward the rear side, respectively.

The solid electrolyte 122, the reference gas side electrode 123, and the measurement target gas side electrode 125 form a detection cell for detecting the concentration of oxygen in the measurement target gas. The measurement target gas side electrode 125 faces the measurement chamber 111, and the reference gas side electrode 123 faces an air introduction chamber 131 described later.

The lead portion 123L is electrically connected to the sensor-side electrode pad 14 via through-holes formed through the cell layer 121, the measurement chamber layer 110b, and the protection layer 110a. The lead portion 125L is electrically connected to the sensor-side electrode pad 15 via through-holes formed through the measurement chamber layer 110b and the protection layer 110a.

Detection signals from the reference gas side electrode 123 and the measurement target gas side electrode 125 are outputted to the outside from the sensor-side electrode pads 14, 15 via the two lead wires 79, whereby the oxygen concentration is detected.

The third ceramic layer 130 forms a frame body in which the air introduction chamber 131 is opened in a U shape in a plan view, from the front side (left side in FIG. 2) toward the rear side. Therefore, the air introduction chamber 131 is opened at the rear-side surface (right-side surface in FIG. 2) so as to communicate with the outside.

The heater layer 140 includes a first layer 140a, a second layer 140b, and a heating element 141 disposed between the first layer 140a and the second layer 140b. The first layer 140a is opposed to the third ceramic layer 130. The heating element 141 includes: a heat generating portion 141m having a meandering pattern; and two lead portions 141L extending from both ends of the heat generating portion 141m toward the rear side.

The respective lead portions 141L are electrically connected to the heater-side electrode pads 16, 17 via through-holes formed through the second layer 140b. When a current is applied to the heating element 141 from the heater-side electrode pads 16, 17 via the two lead wires 78, the heating element 141 generates heat, and the solid electrolyte 122 is activated.

The solid electrolyte 122 can be formed of a partially stabilized zirconia sintered body obtained by adding yttria ($Y_2O_3$) or calcia (CaO) as a stabilizer to zirconia ($ZrO_2$), for example.

The reference gas side electrode 123, the measurement target gas side electrode 125, the heating element 141, the sensor-side electrode pads 14, 15, and the heater-side electrode pads 16, 17 can be formed of platinum group elements. Examples of preferable platinum group elements available for these components include Pt, Rh, Pd, and the like. One of these elements may be used solely, or two or more elements may be used in combination.

A stacked body 150 of the first ceramic layer 110 and the second ceramic layer 120 corresponds to the "first layer" of the invention. The third ceramic layer 130 and the heater layer 140 correspond to the "second layer" and the "third layer" of the invention, respectively.

The air introduction chamber 131 corresponds to the "air introduction hole" of the invention.

The first layer or the third layer being "mainly composed of ceramic" means that the total percentage of ceramic among the components of each layer exceeds 50 mass %.

As shown in FIG. 3, in a cross-section perpendicular to the direction of the axis O, a length L1 of a shortest line segment P1 connecting an upper surface 10a of the sensor element 10 and the centroid G1 of the sensor element 10 and a length L2 of a shortest line segment P2 connecting the upper surface 10a of the sensor element 10 and the centroid G2 of the air introduction chamber 131, satisfy a relationship of $|L2-L1|/L1 \leq 0.05$.

That is, the difference in distance between the centers of gravity G1 and G2 from the upper surface 10a of the sensor element 10 toward the stacking direction is less than or equal to ±5%. Since the air introduction chamber 131 occupies the greater part (or the entirety) of the air gap in the sensor element 10, the centers of gravity G1 and G2 being close to each other in the stacking direction indicate that the thicknesses (strengths) of the first layer 150 and the third layer 140 disposed opposite to each other in the stacking direction with the air introduction chamber 131 therebetween are approximately equal to each other.

Therefore, when a load F is applied in the stacking direction to the first layer 150 and the third layer 140 located above and below the air introduction hole 131, an approximately uniform stress is generated against each of the first layer 150 and the third layer 140, thereby improving the breaking strength of the sensor element as compared to the case where the strength of one of the first layer 150 and the third layer 140 is lower than that of the other layer.

In particular, L1=L2 is preferably satisfied because, in this case, the thicknesses (strengths) of the first layer 150 and the third layer 140 are even closer to each other.

The relationship of $|L2-L1|/L1 \leq 0.05$ is satisfied likewise also when the line segments P1 and P2 are defined from a lower surface 10b of the sensor element 10, instead of the upper surface 10a, toward the centers of gravity G1 and G2. Accordingly, the upper surface 10a and the lower surface 10b correspond to the "upper end surface" of the invention.

Figure 4:
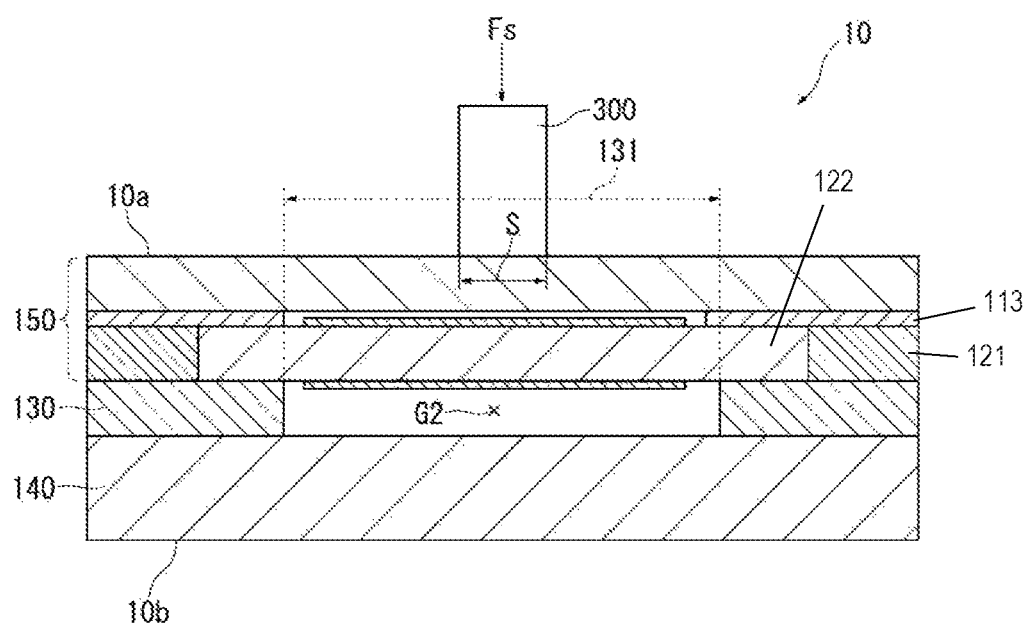
FIG. 4 is a diagram showing a method for measuring the breaking strengths of a first layer and a third layer.
Figure 5:
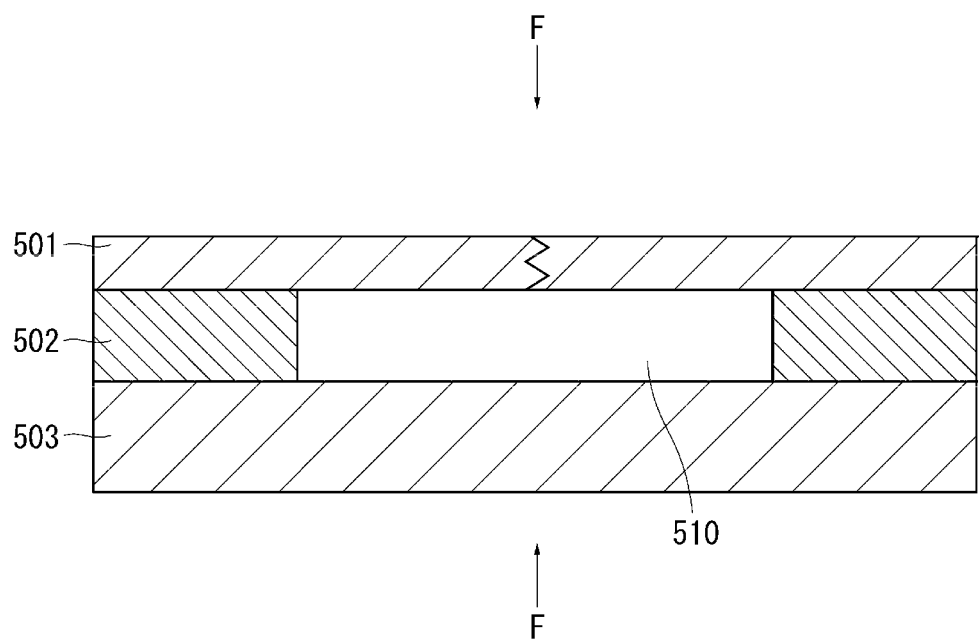
FIG. 5 is a diagram showing a state in which a load is applied to a conventional sensor element having an air introduction hole.

As shown in FIG. 4, when a load Fs is applied toward the centroid G2 along the stacking direction from an outer surface (upper surface 10a) of the first layer 150 in a region S within the air introduction hole 131 as viewed in the stacking direction, the first layer 150 has a breaking strength B1. Likewise, although not shown in FIG. 4, when the load Fs is applied toward the centroid G2 along the stacking direction from an outer surface (lower surface 10b) of the third layer 140 in the region S, the third layer 140 has a breaking strength B2.

In this case, if $|B1-B2|/B2 \leq 0.19$ is satisfied, the first layer 150 and the third layer 140 have approximately equal strengths (the difference between the breaking strengths B1 and B2 is less than or equal to ±19%), whereby the breaking strength when the load F is applied in the stacking direction is improved.

The present invention is not limited to the above embodiment, and is applicable to any gas sensor (sensor element) having an air introduction hole, including the oxygen sensor (oxygen sensor element) of the present embodiment. The present invention is not limited to the aforementioned sensors (sensor elements), and encompasses various modifications and equivalents which fall within the spirit and scope of the claims appended hereto. For example, the present invention may be applied to a NOx sensor (NOx sensor element) for detecting NOx concentration in a measurement target gas, an HC sensor (HC sensor element) for detecting HC concentration therein, and the like.

In addition, the shape and dimension of the air introduction hole are not limited.

Each of the first layer 150, the second layer 130, and the third layer 140 may be a single layer or a stacked body of multiple layers. In addition, as described above, the first layer 150 and/or the third layer 140 may include an air gap (space) other than the air introduction hole 131. However, the height of the space in the stacking direction should be smaller than the height of the air introduction hole 131.

Example 1

Hereinafter, the present invention will be described in more detail by way of examples, which should not be construed as limiting the present invention.

The sensor element 10 shown in FIG. 2 and FIG. 3 was manufactured while varying the thicknesses of the first layer 150 and the third layer 140, which were made of alumina, as shown in Table 1 below. More particularly, Table 1 shows deviations of the centers of gravity G1, G2 while varying the thicknesses of the first layer and the third layer of the sensor element, and whether or not the first layer or the third layer is broken. The thickness t1 of the sensor element 10 from the first layer 150 to the third layer 140 was 1.05 mm, and the width of the air introduction hole 131 (the length of the air introduction hole 131 in the width direction of the sensor element 10) was 1.0 mm.

Using the sensor element 10, as shown in FIG. 4, a head 300 of a load cell was placed on the upper surface 10a of the first layer 150 in the region S within the air introduction hole 131 as viewed in the stacking direction so as to apply a load Fs=200 MPa toward the centroid G2 along the stacking direction. The load with which the first layer 150 was broken was measured, and the load was divided by a unit area to obtain the breaking strength B1. Likewise, the sensor element 10 was turned upside down, and the head 300 of the load cell was placed on the lower surface 10b of the third layer 140 in the region S to obtain the breaking strength B2.

The results are shown in Table 1.

TABLE 1

| THICKNESS(mm) | | | | | | BREAKAGE OF 1st |
|---|---|---|---|---|---|---|
| 1st LAYER | 3rd LAYER | L1(mm) | L2(mm) | (L1-L2)/L1 | (B1-B2)/B2 | LAYER/3rd LAYER |
| 0.370 | 0.370 | 0.525 | 0.525 | 0 | 0 | NOT OBSERVED |
| 0.344 | 0.396 | 0.525 | 0.499 | 0.05 | 0.19 | NOT OBSERVED |
| 0.319 | 0.421 | 0.525 | 0.473 | 0.10 | 0.38 | OBSERVED |
| 0.291 | 0.449 | 0.525 | 0.446 | 0.15 | 0.37 | OBSERVED |

As shown in Table 1, when the relationship of $|L2-L1|/L1 \leq 0.05$ or $|B1-B2|/B2 \leq 0.19$ is satisfied, the first layer 150 and the third layer 140 were not broken. On the other hand, when the relationship is not satisfied, the first layer 150 or the third layer 140 was broken.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-116056 filed Jun. 13, 2017, the disclosure of which is incorporated herein by reference in its entirety.

What is claimed is:

1. A plate-shaped sensor element extending in an axial direction, and comprising at least a first layer, a second layer and a third layer being stacked in a stacking direction, wherein
    the first layer and the third layer are mainly formed of ceramic,
    the second layer is disposed between the first layer and the third layer in the stacking direction,
    the second layer has an air introduction hole opened at a rear end surface thereof in the axial direction,
    the third layer is a heater layer which has a heating element inside thereof, and the heating element includes a heat generating portion at a front-end side of the sensor element in the axial direction, and
    in a cross-section perpendicular to the direction of the axis, a length L1 of a shortest line segment P1 connecting an upper end surface of the sensor element and the centroid G1 of the sensor element and a length L2 of a shortest line segment P2 connecting the upper end surface of the sensor element and the centroid G2 of the air introduction hole, satisfy a relationship of $|L2-L1|/L1 \leq 0.05$.

2. The sensor element as claimed in claim 1, wherein a relationship of L1=L2 is satisfied.

3. The sensor element as claimed in claim 1, wherein when a load is applied toward the centroid G2 along the stacking direction from each of outer surfaces of the first layer and the third layer in a region within the air introduction hole as viewed in the stacking direction, a breaking strength B1 of the first layer and a breaking strength B2 of the third layer satisfy a relationship of $|B1-B2|/B2 \leq 0.19$.

4. The sensor element as claimed in claim 1, which is a limiting current type sensor element.

5. A gas sensor comprising the plate-shaped sensor element as claimed in claim 1 and a metallic shell holding the sensor element.

6. The sensor element as claimed in claim 1, wherein the first layer has a gas measurement chamber disposed on the front-side in the axial direction.

7. The sensor element as claimed in claim 6, wherein the first layer has a first electrode and a second electrode, the first electrode is configured to be exposed to a gas in the measurement chamber, and the second electrode is exposed to the air introduction hole.

* * * * *